(12) United States Patent
Sanji et al.

(10) Patent No.: US 9,751,497 B2
(45) Date of Patent: Sep. 5, 2017

(54) VEHICLE CONTROL APPARATUS

(71) Applicant: DENSO CORPORATION, Kariya, Aichi-pref. (JP)

(72) Inventors: Kenichiro Sanji, Kariya (JP); Tatuya Katoh, Kariya (JP); Noritaka Hirao, Kariya (JP); Suguru Matsushita, Kariya (JP); Koji Nakao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/033,124

(22) PCT Filed: Oct. 9, 2014

(86) PCT No.: PCT/JP2014/005136
§ 371 (c)(1),
(2) Date: Apr. 29, 2016

(87) PCT Pub. No.: WO2015/064020
PCT Pub. Date: May 7, 2015

(65) Prior Publication Data
US 2016/0272154 A1    Sep. 22, 2016

(30) Foreign Application Priority Data
Nov. 1, 2013    (JP) ................................ 2013-228416

(51) Int. Cl.
*B60R 25/24*    (2013.01)
*H04W 12/06*    (2009.01)
(Continued)

(52) U.S. Cl.
CPC ............ *B60R 25/245* (2013.01); *B60R 25/24* (2013.01); *G06K 9/00791* (2013.01); *G07C 9/00* (2013.01);
(Continued)

(58) Field of Classification Search
CPC ...... B60R 25/209; B60R 25/31; B60R 25/245; G07C 9/00182; G07C 9/00309;
(Continued)

(56) References Cited

U.S. PATENT DOCUMENTS 4,873,530 A * 10/1989 Takeuchi ........... G07C 9/00309
343/711
6,049,268 A *  4/2000 Flick ...................... B60K 28/00
340/12.54

(Continued)

FOREIGN PATENT DOCUMENTS

JP    2005086579 A    3/2005
JP    2007303254 A    11/2007
(Continued)

*Primary Examiner* — Thomas G Black
*Assistant Examiner* — Sara Lewandroski
(74) *Attorney, Agent, or Firm* — Harness, Dickey & Pierce, P.L.C.

(57) ABSTRACT

A vehicle control apparatus includes: a first communicator that has a communication range outside a vehicle and communicates with a portable communication terminal by a predetermined first wireless communication system; a second communicator that has a communication range in a vehicle compartment of the vehicle and communicates with the portable communication terminal by a second wireless communication system; a first authenticator that receives identification information from the portable communication terminal; a second authenticator that receives identification information from the portable communication terminal; a determinator that determines that the portable communication terminal exists within a predetermined range outside the vehicle, and determines that the portable communication terminal exists in the vehicle compartment of the vehicle; and a controller that permits or causes an electronic control device controlling an action of the vehicle to perform a predetermined action.

7 Claims, 5 Drawing Sheets

(51) Int. Cl.
*H04W 4/04* (2009.01)
*H04N 5/44* (2011.01)
*G06K 9/00* (2006.01)
*G07C 9/00* (2006.01)
*B60R 25/31* (2013.01)

(52) U.S. Cl.
CPC .............. *H04N 5/44* (2013.01); *H04W 4/046* (2013.01); *H04W 12/06* (2013.01); *B60R 25/31* (2013.01); *B60R 2325/101* (2013.01); *B60R 2325/103* (2013.01); *G06T 2207/30252* (2013.01)

(58) Field of Classification Search
CPC ............ G07C 9/00984; G07C 9/00992; G07C 2009/0019; G07C 2009/00206; G07C 2009/00261; G07C 2009/00285; G07C 2009/00293; G07C 2009/00301; G07C 2009/00269; G07C 2009/00277; G07C 2009/00317; G07C 2009/00333; G07C 2009/00388; G07C 2009/00396; G07C 2009/00507; G07C 2009/00515; G07C 2009/00523; G07C 2009/00531; G07C 2009/00539; G07C 2009/00547; H04W 4/02; H04W 4/046; H04W 12/06
See application file for complete search history.

(56) References Cited

U.S. PATENT DOCUMENTS

| | | | | |
|---|---|---|---|---|
| 6,236,333 B1 * | 5/2001 | King | ................... | B60R 25/2036 340/10.1 |
| 6,624,741 B1 * | 9/2003 | Dais | .................... | B60R 25/2009 340/5.64 |
| 7,042,342 B2 * | 5/2006 | Luo | ......................... | B60R 25/00 340/426.13 |
| 7,046,119 B2 * | 5/2006 | Ghabra | ................. | B60R 25/245 340/5.61 |
| 7,355,511 B2 * | 4/2008 | Harumoto | ............. | B60R 25/102 340/426.13 |
| 7,425,886 B2 * | 9/2008 | Yoshii | ...................... | B60R 25/24 340/5.2 |
| 7,850,078 B2 * | 12/2010 | Christenson | ............ | B60R 25/24 235/382 |
| 8,284,020 B2 * | 10/2012 | Ghabra | ................. | B60R 25/245 340/5.61 |
| 8,427,289 B2 * | 4/2013 | Ghabra | ................. | B60R 25/24 340/426.36 |
| 8,571,725 B2 * | 10/2013 | Juzswik | ................ | B60R 25/245 701/2 |
| 8,620,490 B2 * | 12/2013 | Lickfelt | ................. | B60R 25/00 340/438 |
| 8,717,142 B2 * | 5/2014 | Nagao | ................. | B60R 25/2036 340/426.36 |
| 8,744,482 B2 * | 6/2014 | Margalef | .............. | G01S 5/0252 340/5.61 |
| 9,008,641 B2 * | 4/2015 | Yang | ..................... | H04W 4/046 455/414.1 |
| 9,079,560 B2 * | 7/2015 | Gautama | ............... | B60R 25/245 |
| 9,129,454 B2 * | 9/2015 | Ghabra | .................. | B60R 25/00 |
| 9,299,205 B2 * | 3/2016 | Kameyama | ............ | B60R 25/20 |
| 2003/0193388 A1 * | 10/2003 | Ghabra | .................. | B60R 25/24 340/5.61 |
| 2007/0030165 A1 * | 2/2007 | Teshima | ................ | B60R 25/245 340/8.1 |

FOREIGN PATENT DOCUMENTS

| | | | |
|---|---|---|---|
| JP | 2009253494 A | | 10/2009 |
| JP | 2011074721 A | * | 4/2011 |
| JP | 2011074721 A | | 4/2011 |
| JP | 2011247076 A | | 12/2011 |
| JP | 2011255787 A | | 12/2011 |
| JP | 2012046918 A | * | 3/2012 |
| JP | 2012046918 A | | 3/2012 |

\* cited by examiner

VEHICLE CONTROL APPARATUS

CROSS-REFERENCE TO RELATED APPLICATIONS

This application is a U.S. National Phase Application under 35 U.S.C. 371 of International Application No. PCT/JP2014/005136 filed on Oct. 9, 2014 and published in Japanese as WO 2015/064020 A1 on May 7, 2015. This application is based on and claims the benefit of priority from Japanese Patent Application No. 2013-228416 filed on Nov. 1, 2013. The entire disclosures of all of the above applications are incorporated herein by reference.

TECHNICAL FIELD

The present disclosure relates to a vehicle control apparatus that wirelessly communicates with a portable communication terminal and permits or executes various actions of a vehicle.

BACKGROUND ART

An electronic key system has been proposed. The electronic key system performs a wireless communication between a portable communication terminal such as a so-called smartphone and a vehicle control apparatus mounted to a vehicle, and the electronic key system causes a door to be locked or unlocked or an engine to be started when authentication information on the portable communication terminal and authentication information on the vehicle coincide with each other. In this type of electronic key system, the portable communication terminal and a vehicle communicate with each other by employing a short distance wireless communication such as Bluetooth (registered trademark) that is widely prevailing among portable communication terminals including the smartphone.

A service to change control contents to be implemented according to a positional relationship between a portable communication terminal and a vehicle is proposed, so that when the portable communication terminal approaches the vehicle, locking or unlocking a door is permitted, or when the portable communication terminal exists in a vehicle compartment, starting an engine is permitted. This kind of service utilizes a technology (refer to, for example, patent literature 1) which measures a distance on the basis of a received electric wave intensity of a wireless signal or a response time elapsing from transmission of the wireless signal to receiving a response signal of transmission a range finding request signal.

The inventors of the present application have found the following regarding a vehicle control apparatus.

According to a technique of measuring a distance based on the received electric wave intensity or a response time in wireless communication, a measured value of the received electric wave intensity or the response time to the distance may change according to an environment in which electric wave propagates, and an error may occur in the distance to be measured. When a result of distance measurement has an error, a determination around a border of a vehicle compartment and a place outside the vehicle may be unreliable, and a false determination may occur.

PRIOR ART LITERATURE

Patent Literature

Patent literature 1: JP 2009-253494 A

SUMMARY OF INVENTION

It is an object of the present disclosure to provide a technology surely determining whether a portable communication terminal used as an electronic key exists in a vehicle compartment or a vehicle outside.

A vehicle control apparatus according to one aspect of the present disclosure comprises a first communicator, a second communicator, a first authenticator, a second authenticator, a determinator, and a controller. The first communicator has a communication range outside a vehicle, and communicates with a portable communication terminal by a predetermined first wireless communication system. The second communicator has a communication range in a vehicle compartment of the vehicle, and communicates with the portable communication terminal by a second wireless communication system, which is different from the first wireless communication system. The first authenticator receives identification information from the portable communication terminal with the first communicator, and authenticates received identification information. The second authenticator receives identification information from the portable communication terminal with the second communicator, and authenticates received identification information.

The determinator determines that the portable communication terminal exists within a predetermined range outside the vehicle when the portable communication terminal is authenticated by the first authenticator and when the portable communication terminal is not authenticated by the second authenticator, and determines that the portable communication terminal exists in the vehicle compartment of the vehicle when the portable communication terminal is authenticated by the first authenticator and when the portable communication terminal is authenticated by the second authenticator. The controller permits or causes an electronic control device controlling an action of the vehicle to perform a predetermined action corresponding to a position of the portable communication terminal determined by the determinator.

According to the vehicle control apparatus of the present disclosure, based on whether a portable communication terminal has been authenticated by two communicators of the first communicator that performs communication directed to the outside of a vehicle and the second communicator that performs communication directed to a vehicle compartment, it may be possible to surely determine whether the portable communication terminal used as an electronic key exists outside the vehicle or in the vehicle compartment. In a conventional method that uses as a determination factor a physical quantity having an error, such as a received electric wave intensity or response time to determine whether the portable communication terminal exists outside the vehicle or in the vehicle compartment, the outside and vehicle compartment may be erroneously determined. According to the present disclosure, since a combination of authentications by the two communicators having different communication ranges is used as the determination factor, compared with a case where a phenomenon having an error such as the received electric wave intensity is used as the determination factor, it may be possible to reduce erroneous determination.

BRIEF DESCRIPTION OF DRAWINGS

The above and other aspects, features and advantages of the present disclosure will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. The present disclosure will not be limited to the embodiment but can be implemented in various forms.

Configuration of Electronic Key System

Figure 1A:
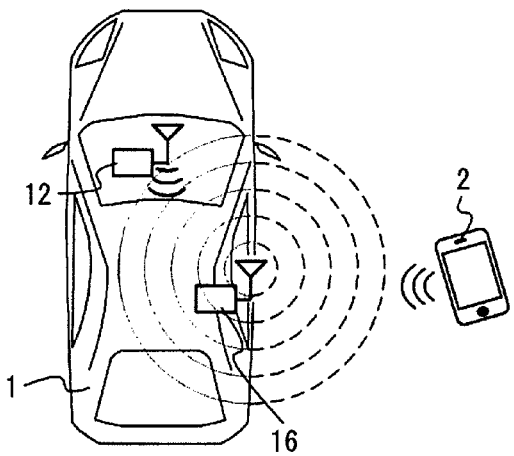
FIG. 1A is a diagram illustrating an outline configuration of an electronic key system.
Figure 1B:
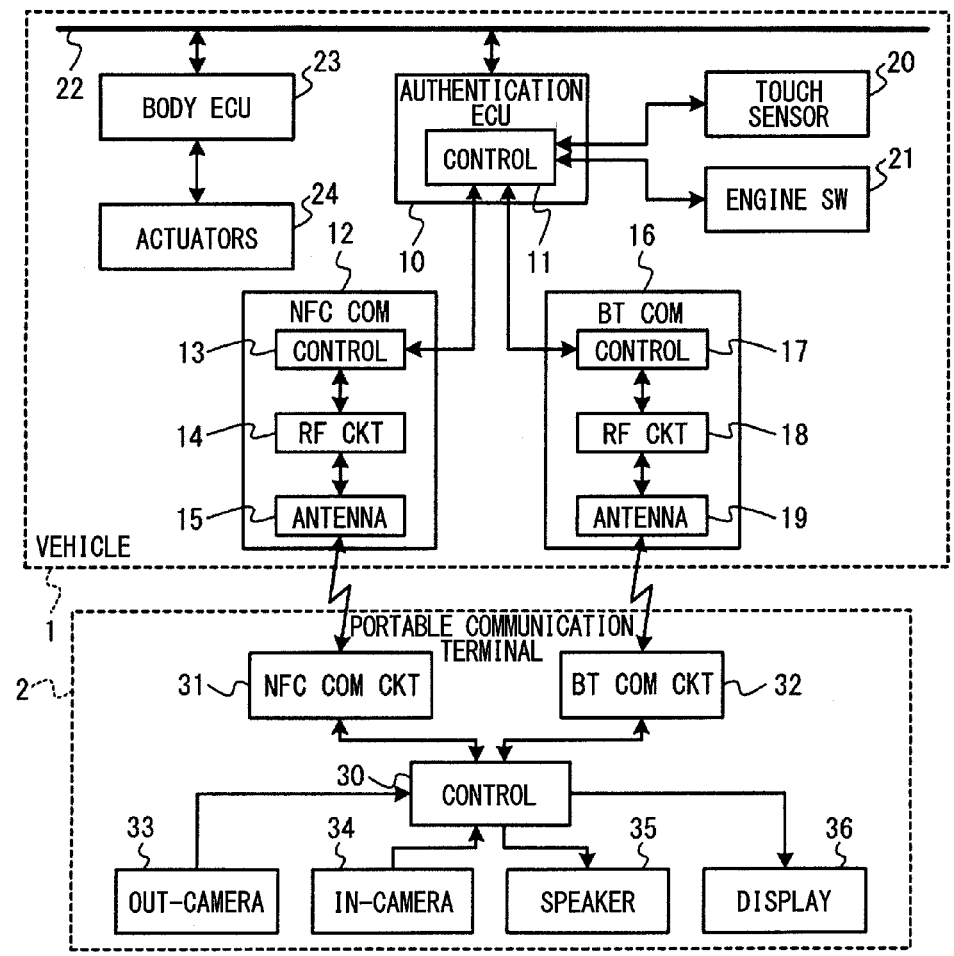
FIG. 1B is a block diagram illustrating the outline configuration of the electronic key system.

As shown in FIG. 1A and FIG. 1B, an electronic key system of the embodiment includes a vehicle control apparatus including an authentication ECU 10, a near field communication (NFC) communicator 12, a BT communicator 16, which are mounted to a vehicle 1, and a portable communication terminal 2 carried by a user of the vehicle 1. The phrase of "BT" stands for Bluetooth.

The authentication ECU 10 is an electronic control device that performs an authentication processing on the portable communication terminal 2 using wireless communication, and permits or executes lighting of a welcome light, locking or unlocking of a door, or starting of an engine according to a result of authentication. The authentication ECU 10 includes a controller 11 provided with an information processor including mainly a CPU, ROM, and RAM which are not shown. In the authentication ECU 10, an ID (identification) code for authentication used in the electronic key system is registered.

The NFC communicator 12 and BT communicator 16 are connected to the authentication ECU 10, and wireless communications based on different communication methods can be performed with the portable communication terminal 2 through the respective communicators. Therefore, the authentication ECU 10 can authenticate the portable communication terminal 2 through both the wireless communication via the NFC communicator 12 and the wireless communication via the BT communicator 16.

The NFC communicator 12 is a communication module that performs wireless communication, which is conformable to a communications protocol for a short distance wireless communication in a near field type (a near-field type near field communication, NFC), with an NFC communication circuit 31 incorporated in the portable communication terminal 2. The NFC communicator 12 mounted to the vehicle 1 includes at least a reader writer feature for NFC. In addition, a card emulation feature and a P2P feature may be added. Accordingly, the NFC communicator 12 intermittently transmits a carrier wave for feeding power to the NFC communication circuit 31 of the portable communication terminal 2 while the NFC communicator 12 is in operation. Then, the NFC communicator 12 communicates with the NFC communication circuit 31, which is activated with power obtained by receiving the carrier wave. The NFC communicator 12 includes a controller 13, an RF circuit 14, and an antenna 15. The controller 13 is an electronic circuit controlling the NFC communicator 12. The RF circuit 14 is a high-frequency circuit converting a baseband signal into a wireless frequency signal or vice versa. The antenna 15 has characteristic of performing communications within a range from about several centimeters to about ten centimeters. The antenna 15 is placed to, for example, an authentication stand which is located in the vicinity of a center console in a vehicle compartment and on which the portable communication terminal 2 is placed. The authentication stand is a stand intended to place the portable communication terminal 2 when the portable communication terminal 2 is used as an electronic key in the vehicle compartment. When the portable communication terminal 2 is placed on the authentication stand, the authentication ECU 10 and the portable communication terminal 2 perform NFC communication with each other.

The authentication ECU 10 checks the portable communication terminal 2 placed on the authentication stand and becoming communicable by the NFC communicator 12 to determine whether the portable communication terminal 2 can be used as an electronic key with which the vehicle 1 is operated. More specifically, the authentication ECU 10 receives an ID code for authentication from the portable communication terminal 2 through the NFC communicator 12. The authentication ECU 10 checks the received ID code for authentication with an ID code for authentication which is registered in advance in the authentication ECU 10. The portable communication terminal is authenticated when the ID codes coincide with each other.

The BT communicator 16 is a communication module that performs versatile wireless communication of a communication method, which is conformable to Bluetooth communication protocol, with a BT communication circuit 32 included in the portable communication terminal 2. The BT communicator 16 can communicate with the portable communication terminal 2 within a range of radii from about 1 meter to about 100 meters. The BT communicator 16 includes a controller 17 that is an electronic circuit which controls the BT communicator 16, an RF circuit 18 that is a high-frequency circuit which converts a baseband signal into a wireless frequency signal or vice versa, and an antenna 19. The antenna 19 is disposed to transmit electric waves to a space outside a vehicle. More particularly, the antenna 19 may be attached to the external surface of a door on the side of a driver seat. In this case, a vehicle body structure that restricts electric waves which invade into a vehicle compartment, such as, a vehicle body steel plate or interior panel is interposed between the antenna 19 and the space in the vehicle compartment. Thus, the electric waves that propagate to the vehicle compartment may be shielded to some extent, while electric waves are intensely radiated to outside the vehicle 1. When the antenna 19 is mounted to the vehicle compartment, for example, when the antenna 19 is attached to a window glass, the antenna 19 is attached so that electric waves to be transmitted or received via the antenna 19 will be oriented to the outside of the vehicle.

The authentication ECU 10 transmits a connection request signal from the BT communicator 16 when the vehicle 1 is parked or stopped, establishes a Bluetooth communication connection (hereinafter, referred to as a BT communication connection) with the portable communication terminal 2 that has received the connection request signal and responded to the connection request signal, and performs information communication. Alternatively, after the authentication ECU 10 receives the connection request signal from the portable communication terminal 2, the authentication ECU 10 may establish the BT communication connection with the portable communication terminal 2. The authentication ECU 10 checks the portable communication terminal 2, with which the BT communication connection has been established, to determine whether the portable communication terminal 2 can be used as an electronic key with which the vehicle 1 is operated. More specifically, the authentication ECU 10 receives an ID code for authentication from the portable communication terminal 2 via the BT communicator 16. The authentication ECU 10 collates the received ID code for authentication with an ID code for authentication that is preliminarily registered in the authentication ECU 10. The portable communication terminal is authenticated when the ID codes coincide with each other.

The authentication ECU 10 is connected to a touch sensor 20 that is included to the vehicle 1. By acquiring a result of detection performed by the touch sensor 20, the authentication ECU 10 recognizes a user's intention of locking or unlocking a door. The touch sensor 20 is formed with a sensor sensing a touch or a button switch, which are disposed to an external knob of a door of the vehicle 1, and detects a person's deed of touching a doorknob of the vehicle 1. The authentication ECU 10 is connected to an engine switch 21. By acquiring an entry of a maneuver performed on the engine switch, the authentication ECU 10 recognizes user's intention of starting an engine. The engine switch 21 is formed with a button switch disposed to an instrument panel in the vicinity of a driver seat, and receives a maneuver instruction that starts the engine.

The authentication ECU 10 is connected onto a communication bus 22 that is a communication path for an in-vehicle communication network. The authentication ECU 10 communicates with a body ECU 23 over the communication bus 22, and controls various actuators 24 included in the vehicle 1. The body ECU 23 is an electronic control device that controls pieces of interior equipment such as an electric door lock, lighting, and a power feed system. The various actuators 24 that are driving sources for the pieces of interior equipment of the vehicle 1 are connected to the body ECU 23.

The portable communication terminal 2 is electronic equipment used as an electronic key with which a door of the vehicle 1 is locked or unlocked or an engine is started, and is implemented with a sophisticated portable cellular phone, for example, a so-called smartphone. The portable communication terminal 2 includes a controller 30, the NFC communication circuit 31, the BT communication circuit 32, an out camera 33, an in camera 34, a loudspeaker 35 that outputs sounds, and a display 36 that displays an image.

The controller 30 is an information processor formed mainly with a CPU, ROM, and RAM which are not shown, and controls various actions of the portable communication terminal 2. In the controller 30, an ID code for authentication is registered as information based on which the portable communication terminal 2 is allowed to act as an electronic key.

The NFC communication circuit 31 and BT communication circuit 32 are connected to the controller 30. Wireless communications based on different communication methods can be performed with the authentication ECU 10 of the vehicle 1 via the respective communicators.

The NFC communication circuit 31 is a communication circuit that performs short distance communication of a communication method, which is conformable to NFC communications protocol, with the NFC communicator 12 mounted to the vehicle 1. The NFC communication circuit 31 incorporated in the portable communication terminal 2 is provided with at least a card emulation feature out of NFC communication features. The card emulation feature is a passive communication feature. Accordingly, when the portable communication terminal 2 is carried into a communicable range of the NFC communicator 12 mounted to the vehicle 1, the NFC communication circuit 31 is activated with power obtained from a carrier wave received from the NFC communicator 12, and transmits an ID code for authentication, which is registered in advance, to the NFC communicator 12. The BT communication circuit 32 is a communication module that performs a short distance communication of a communication method, which is conformable to Bluetooth communications protocol, with the BT communicator 16 mounted in the vehicle 1. The BT communicator 16 can communicate with the BT communicator 16 of the vehicle 1 within a range of radii from about 1 meter to about 100 meters.

The out camera 33 is an imaging device having a lens on the back surface (behind an operating surface) of the portable communication terminal 2, and images scenery seen from the back surface of the portable communication terminal 2. The in camera 34 is an imaging device having a lens on the operating surface of the portable communication terminal 2, and images scenery seen from the operating surface of the portable communication terminal 2. The controller 30 transmits the images (image information), which are produced by the out camera 33 and in camera 34, to the authentication ECU 10 through the BT communication circuit 32.

The controller 30 can transmit an ID code for authentication, which is employed in an electronic key system, through either of the NFC communication circuit 31 and BT communication circuit 32. Accordingly, when the controller 30 exists outside the vehicle 1 within a communication zone of the BT communicator 16 of the vehicle 1, the controller 30 uses the BT communication circuit 32 to transmit the ID code for authentication. In contrast, when the controller 30 exists in the vicinity of the authentication stand in a vehicle compartment within a communication zone of the NFC communicator 12 of the vehicle 1, the controller 30 uses the NFC communication circuit 31 to transmit the ID code for authentication.

Position Determination Processing of First Embodiment

Figure 2:
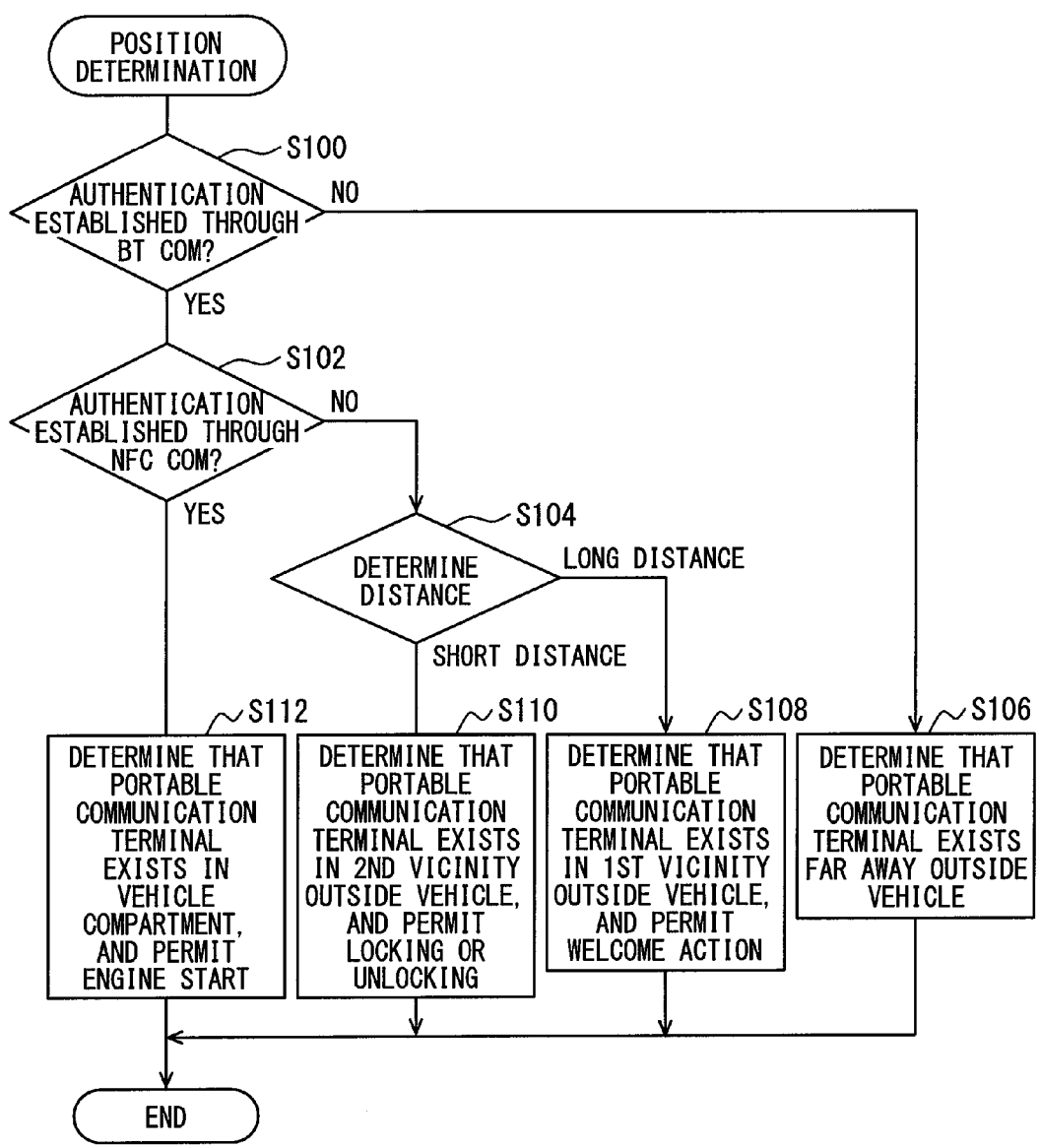
FIG. 2 is a flowchart describing a procedure of position determination processing of a first embodiment.

A procedure of a first embodiment of a position determination processing to be performed by the controller 11 of the authentication ECU 10 will be described with reference to the flowchart of FIG. 2. The controller 11 performs the position determination processing at the timing described below. The position determination processing is repeatedly performed at predetermined control interval while a vehicle is parked. The position determination processing is performed when a specific event occurs, for example, when the touch sensor 20 senses a touch, the engine switch 21 is depressed, or a door is opened or closed. The position determination processing is performed in a predetermined time since a certain event occurs.

At S100, the controller 11 determines whether the portable communication terminal 2 has been authenticated through Bluetooth communication. Incidentally, the authentication is performed by collating an ID code for authentication, which is received from the portable communication terminal 2 via the BT communicator 16, with an ID code for authentication registered in advance in the authentication ECU 10. When the portable communication terminal has been authenticated through Bluetooth communication (S100: Yes), the controller 11 proceeds to S102. In contrast, when the portable communication terminal has not been authenticated through Bluetooth communication (S100: No), the controller 11 proceeds to S106. At S106, the controller 11 determines that the portable communication terminal 2 usable as an electronic key does not exist within a communicable zone (far away outside a vehicle), and terminates the processing.

In contrast, at S102 to which the controller 11 proceeds when the portable communication terminal has been authenticated through Bluetooth communication, the controller 11 determines whether the portable communication terminal 2 has been authenticated through NFC communication. Incidentally, the authentication is performed by collating an ID code for authentication, which is received from the portable communication terminal 2 via the NFC communicator 12, with an ID code for authentication registered in advance in the authentication ECU 10. When the portable communication terminal has been authenticated through NFC communication (S102: Yes), the controller 11 proceeds to S112. When the portable communication terminal has not been authenticated through NFC communication (S102: No), the controller 11 proceeds to S104.

At S104, the controller 11 determines the distance between the authenticated portable communication terminal 2 and the vehicle 1, and branches the processing according to a result of the determination. The distance between the vehicle 1 and the portable communication terminal 2 is specified according to a measurement method that employs received electric wave intensity (for example, a received signal strength indication, RSSI). Aside from RSSI, a known technique such as a time of arrival (TOA), time difference of arrival (TDOA), or angle of arrival (AOA) may be adopted. Otherwise, when a GPS receiver is included in the vehicle 1 and the portable communication terminal 2 alike, the distance may be calculated based on results of positioning performed by the GPS receivers of the vehicle and portable communication terminal respectively.

When the distance between the vehicle 1 and the portable communication terminal 2 corresponds to a long distance greater than a predetermined reference distance (S104: long distance), the controller 11 proceeds to S108. At S108, the controller 11 determines that the portable communication terminal 2 exists within a predetermined first vicinity range outside the vehicle. In this case, the controller 11 permits a feature (a welcome action), which allows a foot lamp or a room lamp of the vehicle 1 to be lit, to be implemented as an action associated with the first vicinity range outside the vehicle. The controller 11 instructs the body ECU 23 to light the foot lamp or the room lamp. The body ECU 23 lights the foot lamp or the room lamp in response to the instruction from the controller 11. After S108, the controller 11 terminates the processing.

In contrast, when the distance between the vehicle 1 and the portable communication terminal 2 corresponds to a short distance equal to or less than the predetermined reference distance (S104: short distance), the controller 11 proceeds to S110. At S110, the controller 11 determines that the portable communication terminal 2 exists within a second vicinity range outside the vehicle which is closer to the vehicle 1 than the first vicinity range outside the vehicle is. In this case, the controller 11 permits locking or unlocking of a door, which is achieved by an electric door lock, as an action associated with the second vicinity range outside the vehicle. The controller 11 notifies the body ECU 23 of permission for locking or unlocking. When the body ECU 23 is permitted to lock or unlock the door by the controller 11, the body ECU 23 locks or unlocks the door by activating an actuator of the electric door lock when the touch sensor 20 has sensed a touch. After S110, the controller 11 terminates the processing.

In contrast, at S112 to which the controller 11 proceeds when the controller 11 determines at S102 that the portable communication terminal has been authenticated through NFC communication, the controller 11 determines that the portable communication terminal 2 exists in a vehicle compartment. In this case, the controller 11 permits engine start as an action associated with the vehicle compartment. When the controller 11 has permitted the engine start, and when the engine switch 21 is turned on by a user, the engine starts. After S112, the controller 11 terminates the processing.

Effects of First Embodiment

The first embodiment has effects described below.

Based on whether the portable communication terminal has been authenticated by either or both of two communicators, that is, the BT communicator 16 that performs communication directed to the outside of a vehicle and the NFC communicator 12 that performs communication directed to a vehicle compartment, whether the portable communication terminal 2 to be used as an electronic key exists outside the vehicle or in the vehicle compartment is determined. Since a combination of the authentications by the two communicators having different communication ranges is regarded as a determination factor, compared with a case where a phenomenon susceptible to an error, such as, a received electric wave intensity is regarded as the determination factor, it may be possible to reduce erroneous determination of the outside of the vehicle from the vehicle compartment.

The distance of the portable communication terminal 2, which is found to exist outside a vehicle, from the vehicle 1 is specified. In case of a long distance, a welcome action is permitted. In case of a short distance, locking or unlocking of a door is permitted. Thus, it may be possible to change the contents of control according to the distance between the vehicle 1 and the portable communication terminal 2.

Position Determination Processing of Second Embodiment

Figure 3:
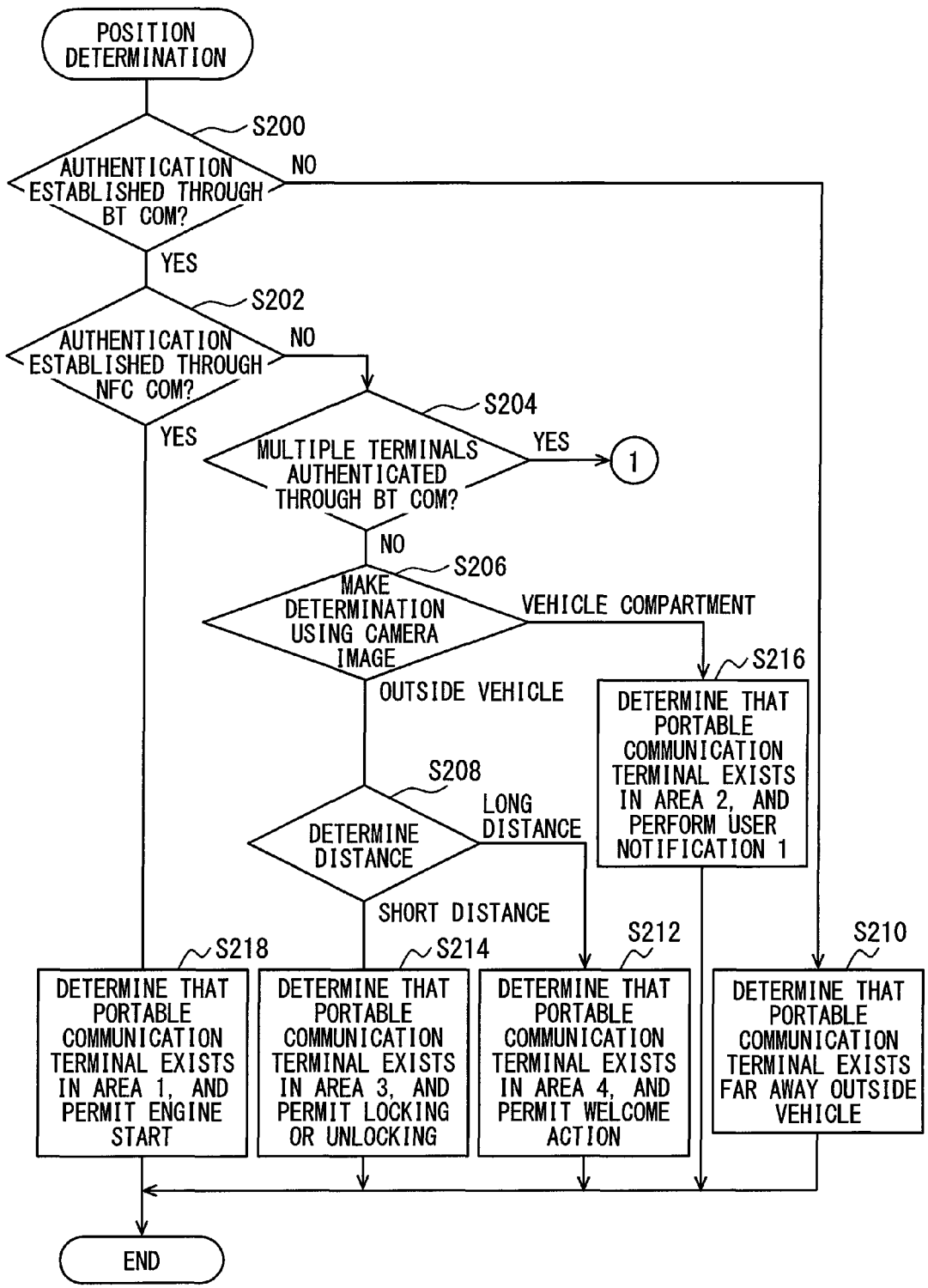
FIG. 3 is a first flowchart describing a procedure of position determination processing of a second embodiment.
Figure 4:
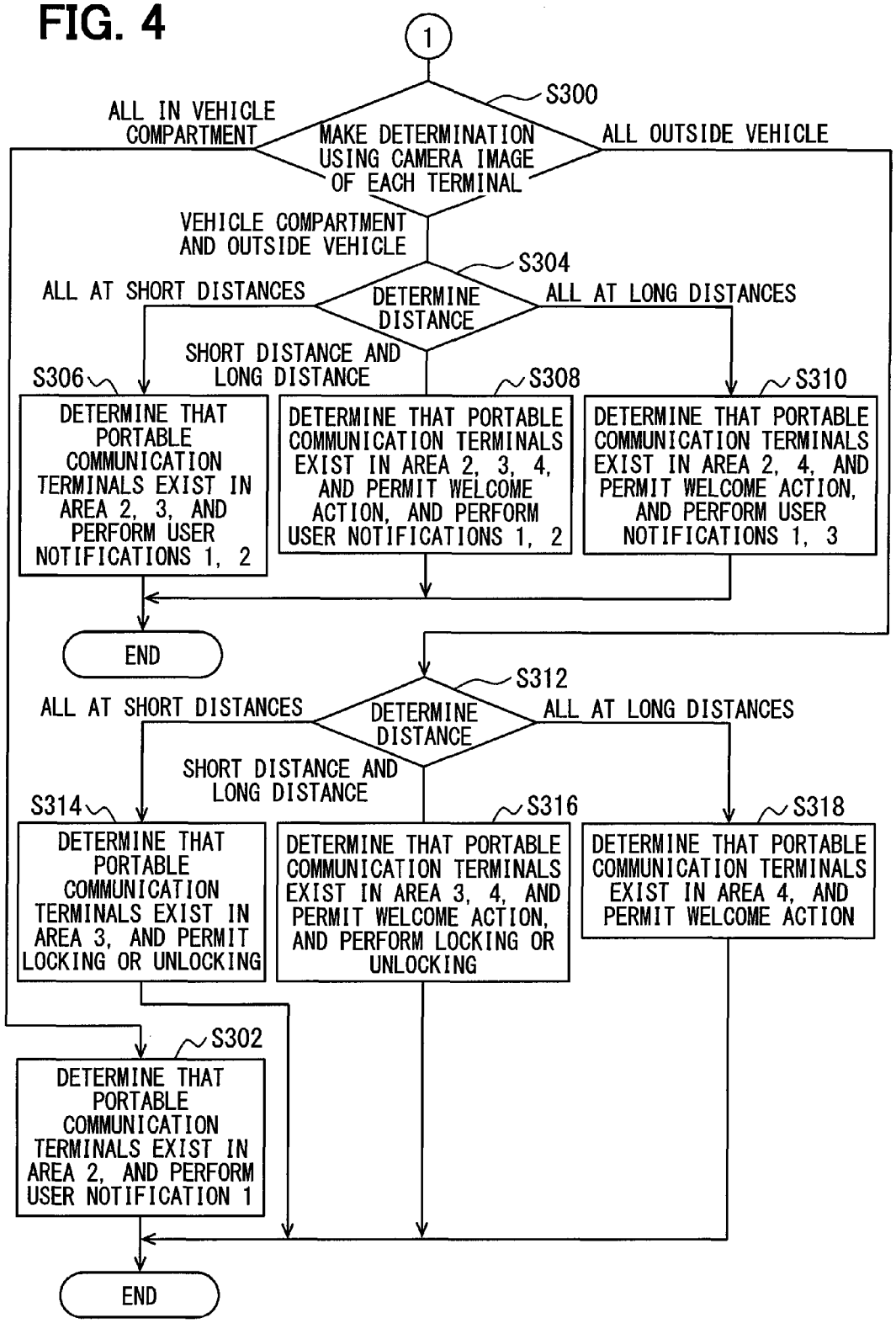
FIG. 4 is a second flowchart describing a procedure of position determination processing of the second embodiment.

A procedure of a second embodiment of the position determination processing, which is performed by the controller 11 of the authentication ECU 10, will be described with reference to the flowcharts of FIG. 3 and FIG. 4. The controller 11 performs the position determination processing at the timings described below. The controller 11 repeatedly performs the position determination processing at predetermined control intervals while a vehicle is parked. The controller 11 performs the position determination processing when a specific event occurs, for example, when the touch sensor 20 senses a touch, the engine switch 21 is depressed, or a door is opened or closed. The controller 11 performs the position determination processing in a predetermined time since a certain event takes place.

At S200, the controller 11 determines whether the portable communication terminal 2 has been authenticated through Bluetooth communication. Incidentally, the authentication is performed by collating the ID code for authentication, which is received from the portable communication terminal 2 through the BT communicator 16, with the ID code for authentication registered in advance in the authentication ECU 10. When the portable communication terminal 2 has been authenticated through Bluetooth communication (S200: Yes), the controller 11 proceeds to S202. When the portable communication terminal 2 has not been authenticated through Bluetooth communication (S200: No), the controller 11 proceeds to S210. At S210, the controller 11 determines that the portable communication terminal 2 usable as an electronic key does not exist within a communicable zone (exists far away outside a vehicle), and terminates the processing.

In contrast, at S202 to which the controller 11 proceeds when the portable communication terminal has been authenticated through Bluetooth communication, the controller 11 determines whether the portable communication terminal 2 has been authenticated through NFC communication. Incidentally, the authentication is performed by collating the ID code for authentication, which is received from the portable communication terminal 2 via the NFC communicator 12, with the ID code for authentication registered in advance in the authentication ECU 10. When the portable communication terminal 2 has been authenticated through NFC communication (S202: Yes), the controller 11 proceeds to S218. In contrast, when the portable communication terminal 2 has not been authenticated through NFC communication (S202: No), the controller 11 proceeds to S204.

At S204, the controller 11 determines whether a plurality of portable communication terminals 2 have currently been authenticated through Bluetooth communication. When the number of portable communication terminals 2 which have been authenticated through Bluetooth communication is one (S204: No), the controller 11 proceeds to S206. At S206, the controller 11 analyzes a camera image produced by the portable communication terminal 2 which has been authenticated, and branches the processing according to a result of analysis.

Herein, the controller 11 uses the BT communicator 16 to transmit a command, which instructs imaging to be performed using cameras, to the portable communication terminal 2. The portable communication terminal 2 uses the out camera 33 and the in camera 34 to image scenery, and uses the BT communication circuit 32 to transmit the produced camera image to the authentication ECU 10. The controller 11 analyzes the camera image received from the portable communication terminal 2, and determines whether the scenery appearing in the camera image represents a vehicle compartment or the outside of a vehicle.

Analysis of the camera image is achieved by, for example, a recognition model which describes feature quantities of the scenery representing a vehicle compartment, and an algorithm for performing image recognition based on a degree of similarity between each of the camera image and geometric information, or an algorithm for performing image recognition based on degrees of similarities of pixel values. When the scenery appearing in the camera image represents the vehicle compartment, the portable communication terminal 2 that has produced the camera image presumably exists in the vehicle compartment. When the scenery appearing in the camera image does not represent the vehicle compartment, the portable communication terminal 2 that has produced the camera image presumably does not exist in the vehicle compartment.

At S206, when a result of analysis performed on the camera image demonstrates that the portable communication terminal 2 exists outside a vehicle (S206: outside), the controller 11 proceeds to S208. At S208, the controller 11 determines the distance between the portable communication terminal 2 which has been authenticated and the vehicle 1, and branches the processing according to a result of the determination. The distance between the vehicle 1 and the portable communication terminal 2 is measured according to a technique such as RSSI, TOA, TDOA, or AOA technique. Otherwise, the distance may be calculated based on results of positioning performed by GPS receivers incorporated in the vehicle 1 and portable communication terminal 2 respectively.

Figure 5:
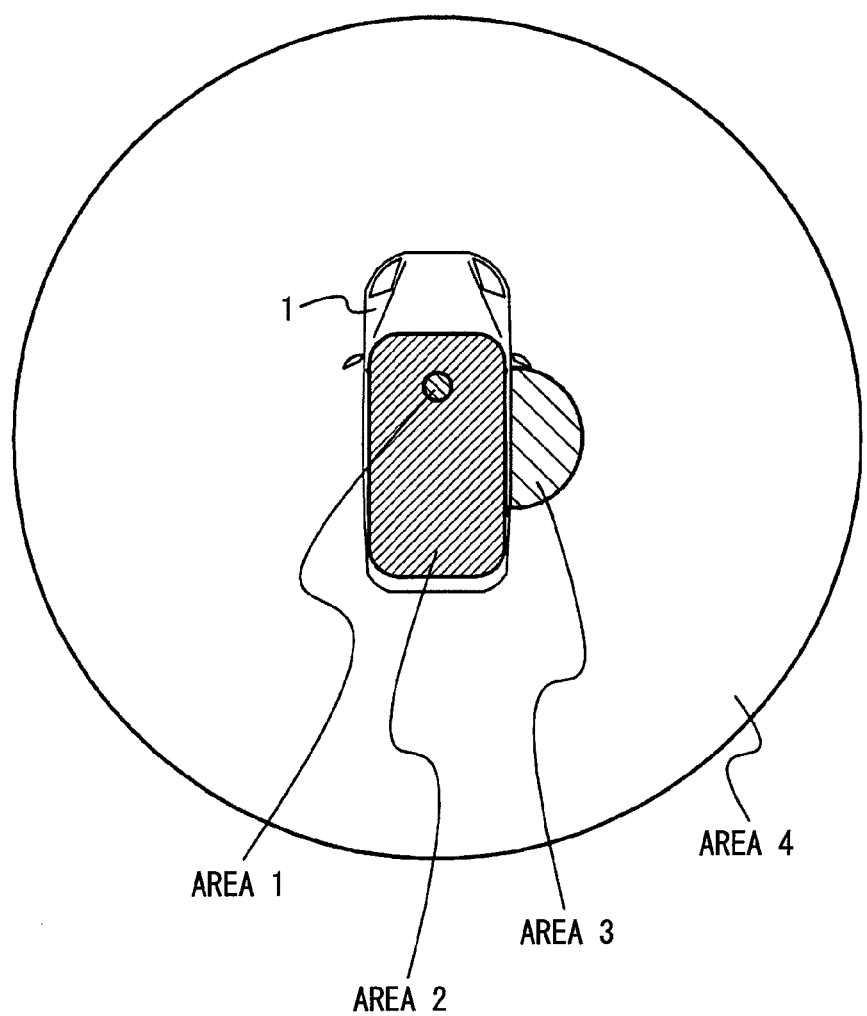
FIG. 5 is a diagram illustrating an area of a determination object.

When the distance between the vehicle 1 and the portable communication terminal 2 corresponds to a long distance greater than a predetermined reference distance (S208: long distance), the controller 11 proceeds to S212. At S212, the controller 11 determines that the portable communication terminal 2 exists within a range of a fourth area (an area 4, and referring to FIG. 5) outside the vehicle. The fourth area is, as shown in FIG. 5, an area within a range of a predetermined distance and shorter distances outside the vehicle 1. In this case, the controller 11 permits a feature (a welcome action), which allows a foot lamp or a room lamp of the vehicle 1 to be lit, to be implemented as an action associated with the fourth area. The controller 11 instructs the body ECU 23 to light the foot lamp or the room lamp. The body ECU 23 lights the foot lamp or the room lamp in response to the instruction sent from the controller 11. After S212, the controller 11 terminates the processing.

In contrast, when the distance between the vehicle 1 and the portable communication terminal 2 corresponds to a short distance equal to or less than the predetermined reference distance (S208: short distance), the controller 11 proceeds to S214. At S214, the controller 11 determines that the portable communication terminal 2 exists within a range of a third area (an area 3, and referring to FIG. 5) which is closer to the vehicle 1 than the fourth area is. The third area is, as shown in FIG. 5, an area corresponding to a range of short distances in the vicinity of a door of a driver seat of the vehicle 1. In this case, the controller 11 permits locking or unlocking of the door, which is achieved by an electric door lock, as an action associated with the third area. The controller 11 notifies the body ECU 23 of the permission for locking or unlocking of the door. When the body ECU 23 is permitted to lock or unlock the door by the controller 11, the body ECU 23 locks or unlocks the door by activating an actuator of the electric door lock when the touch sensor 20 has sensed a touch. After S214, the controller 11 terminates the processing.

In contrast, at S206, when a result of analysis performed on the camera image demonstrates that the portable communication terminal 2 exists in a vehicle compartment (S206: vehicle compartment), the controller 11 proceeds to S216. At S216, the controller 11 determines that the portable communication terminal 2 exists within a range of a second area (an area 2, and referring to FIG. 5) in the vehicle compartment. The second area is, as shown in FIG. 5, an area corresponding to the vehicle compartment of the vehicle 1. A situation in which the portable communication terminal 2 is recognized as existing in the second area is presumably such that the portable communication terminal 2 exists in the vehicle compartment but has not been authenticated by the NFC communicator 12, that is, has not been placed on the authentication stand.

In this case, the controller 11 implements as an action associated with the second area, a first user notification feature (also referred to as a user notification feature 1) that notifies a user of information according to a user's behavior.

A specific procedure to be followed by the first user notification feature will be described below. When a maneuver of turning on the engine switch 2 has been sensed, the controller 11 notifies the user of the fact that the portable communication terminal 2 has not been authenticated through the NFC communication. Notifying the user of information is achieved by outputting an indication using a meter panel of the vehicle 1 or outputting display using the display 36 of the portable communication terminal 2.

When a result of analysis performed on the camera image received from the portable communication terminal 2 existent in the second area demonstrates that the portable communication terminal 2 is not placed on the authentication stand, a notification may be made so as to prompt a user to place the portable communication terminal 2 on the authentication stand. When the camera image produced by the out camera 33 and the in camera 34 reveals that the portable communication terminal 2 is placed on the authentication stand with the face and back of the portable communication terminal oriented reversely or the portable communication terminal 2 is placed at a position deviated from an antenna for NFC communication, notification may be made to prompt the user to correct the position of the portable communication terminal. After S216, the controller 11 terminates the processing.

In contrast, at S218 to which the controller proceeds when the determination is made at S202 that the portable communication terminal has been authenticated through the NFC communication, the controller 11 determines that the portable communication terminal 2 exists in a first area (an area 1, and referring to FIG. 5) in a vehicle compartment. The first area is, as shown in FIG. 5, a range corresponding to the position of the authentication stand disposed near the center console of the vehicle 1. In this case, the controller 11 permits engine start as an action associated with the first area. When the controller 11 has permitted engine start, when the engine switch 21 is turned on by a user, the engine is started. After S112, the controller 11 terminates the processing.

In contrast, when multiple portable communication terminals 2 have been authenticated through Bluetooth communication at S204 (S204: Yes), the controller 11 proceeds to S300 (referring to FIG. 4). At S300, the controller 11 analyzes camera images produced by the multiple portable communication terminals 2 that have been authenticated, and branches the processing according to a result of analysis.

Herein, the controller 11 uses the BT communicator 16 to transmit a command, which instructs imaging to be performed using cameras, to the portable communication terminals that have been authenticated. Each of the portable communication terminals 2 in turn uses the out camera 33 and the in camera 34 to image scenery, and uses the BT communication circuit 32 to transmit the produced camera images to the authentication ECU 10. The controller 11 analyzes the camera images received from each of the portable communication terminals 2, determines whether the scenery appearing in the camera images represents a vehicle compartment or the outside of the vehicle, and determines whether each of the portable communication terminals 2 exists in the vehicle compartment or outside the vehicle.

At S300, when a result of analysis performed on the camera images demonstrates that all the portable communication terminals 2 which have been authenticated exist in the vehicle compartment (S300: all in vehicle compartment), the controller 11 proceeds to S302. At S302, the controller 11 determines that all of the portable communication terminals 2 which have been authenticated exist in a range of the second area (referring to FIG. 5) in the vehicle compartment. In this case, the controller 11 executes as an action associated with the second area, a first user notification feature that notifies a user of information according to a user's behavior. The first user notification feature to be implemented this case is identical to the first user notification feature described in S216. After S302, the controller 11 terminates the processing.

In contrast, at S300, when a result of analysis performed on the camera images demonstrates that the multiple portable communication terminals 2 which have been authenticated mixed exist in a vehicle compartment and outside a vehicle (S300: vehicle compartment and outside the vehicle), that is, at least one authenticated portable communication terminal exists in the vehicle compartment and at least one authenticated portable communication terminal exists outside the vehicle, the controller 11 proceeds to S304. At S304, the controller 11 determines the distance of each of the portable communication terminals 2, which are recognized as existing outside the vehicle, from the vehicle 1, and branches the processing according to a result of determination.

At S304, when all of the portable communication terminals 2 which are recognized as existing outside the vehicle are located at short distances, which are equal to or less than a reference distance, from the vehicle 1 (S304: all at short distances), the controller 11 proceeds to S306. At S306, the controller 11 determines that the portable communication terminals 2 which have been authenticated are distributed to the second area and the third area (referring to FIG. 5). In this case, the controller 11 implements as an action associated with the second area and the third area, the first user notification feature and a second user notification feature (also referred to as a user notification feature 2). The first user notification feature to be implemented at this time is identical to the first user notification feature described in S216.

The second user notification feature is a feature that does not permit locking of a door since the portable communication terminal 2 that acts as an electronic key exists in the vehicle compartment, and notifies a user of the fact that the user has left the portable communication terminal 2 in the vehicle compartment. A specific procedure to be followed by the second user notification feature will be described. When the touch sensor 20 has sensed a touch, the controller 11 does not permit locking of the door, and notifies the user of the fact that the portable communication terminal 2 has been left behind in the vehicle compartment. Notifying the user of information is achieved with, for example, an alarm sound to be outputted from the vehicle 1 or the portable communication terminal 2 or a display to be outputted using the display 36 of the portable communication terminal 2. Alternatively, when the touch sensor 20 has sensed a touch, the controller 11 may permit locking of the door and may tentatively invalidate the capability of the portable communication terminal 2, which exists in the vehicle compartment, to act as the electronic key. After S306, the controller 11 terminates the processing.

In contrast, when a determination is made at S304 that the multiple portable communication terminals include the portable communication terminal 2 whose distance from the vehicle 1 is a long distance greater than the reference distance, and the portable communication terminals 2 whose distances from the vehicle 1 are short distances equal to or less than the reference distance in a mixed manner (S304: far and short distances), the controller 11 proceeds to S308. At S308, the controller 11 determines that the portable communication terminals 2 which have been authenticated are distributed to the second area, the third area, and the fourth area (referring FIG. 5). In this case, as an action associated with the second area, the third area, and the fourth area, the controller 11 permits the welcome action, and implements the first user notification feature and the second user notification feature. The welcome action to be performed is identical to the welcome action described in relation to S212. The first user notification feature is identical to the first user notification feature described in S216. The second user notification feature is identical to the second user notification feature described in S306. After S308, the controller 11 terminates the processing.

In contrast, when the controller 11 determines at S304 that all of the portable communication terminals 2 which have been recognized as existing outside a vehicle are located at the long distances, which are greater than the reference distance, from the vehicle 1 (S304: all at long distances), the controller 11 proceeds to S301. At S310, the controller 11 determines that the portable communication terminals 2 which have been authenticated are distributed to the second area and the fourth area (referring to FIG. 5). In this case, as an action associated with the second area and the fourth area, the controller 11 permits the welcome action, and implements the first user notification feature and a third user notification feature (also referred to as a user notification feature 3). The permission for the welcome action to be given is identical to the permission for the welcome action described in relation to S212. The first user notification feature is identical to the first user notification feature described in relation to S216.

According to the third user notification feature, the controller 11 transmits information, which indicates that the portable communication terminal 2 is left behind in the vehicle compartment, to the portable communication terminal 2 existent in the fourth area. The portable communication terminal 2 in the fourth area in turn outputs sounds through the loudspeaker 35 or outputs a display using the display 36 so as to notify a user of the fact that the portable communication terminal 2 is left behind in the vehicle compartment. After S310, the controller 11 terminates the processing.

In contrast, when a result of analysis performed on the camera images demonstrates that all authenticated portable communication terminals 2 exist outside a vehicle (S300: all outside), the controller 11 proceeds to S312. At S312, the controller 11 determines the distance of each of the portable communication terminals, which have been authenticated, from the vehicle 1, and branches the processing according to a result of determination.

When the controller 11 determines at S312 that all of the portable communication terminals 2 which have been authenticated are located at short distances, which are equal to or less than the reference distance, from the vehicle 1 (S312: all at short distances), the controller 11 proceeds to S314. At S314, the controller 11 determines that all of the portable communication terminals 2 which have been authenticated are distributed to the third area (referring to FIG. 5). In this case, the controller 11 permits locking or unlocking of a door, which is achieved by an electric door lock, as an action associated with the third area. The permission for locking or unlocking of the door to be given is identical to the permission for locking or unlocking of the door described in S214. After S314, the controller 11 terminates the processing.

In contrast, when the controller 11 determines at S312 that the multiple portable communication terminals mixedly include a portable communication terminal 2 whose distance from the vehicle 1 is a long distance greater than a reference distance and a portable communication terminal 2 whose distance from the vehicle 1 is a short distance equal to or less than the reference distance (S313: far and short distances), the controller 11 proceeds to S316. At S316, the controller 11 determines that the portable communication terminals 2 which have been authenticated are distributed to the third area and the fourth area (referring to FIG. 5). In this case, the controller 11 permits as an action associated with the third area and the fourth area, the welcome action and locking or unlocking of a door that is achieved by an electric door lock. The permission for the welcome action to be given is identical to the permission for the welcome action described in S212. The permission for locking or unlocking of the door is identical to the permission for locking or unlocking of the door described in S214. After S316, the controller 11 terminates the processing.

In contrast, when a determination is made at S312 that all of the portable communication terminals 2 which have been authenticated are located at long distances, which are larger than a reference distance, from the vehicle 1 (S312: all at long distances), the controller 11 proceeds to S318. At S318, the controller 11 determines that all of the portable communication terminals 2 which have been authenticated are distributed to the fourth area (see FIG. 5). In this case, the controller 11 permits a welcome action as an action associated with the fourth area. The permission for the welcome action to be given is identical to the permission for the welcome action described in relation to S212. After S318, the controller 11 terminates the processing.

Effects of Second Embodiment

According to the second embodiment, effects described below are obtained.

It may be possible that the authentication ECU 10 determines the portable communication terminal 2, which exists outside a vehicle, from the portable communication terminal 2 that exists in a vehicle compartment while being unauthenticated through the NFC communication by analyzing the camera image produced by the portable communication terminal 2. Accordingly, it may be possible implement a user notification feature prompting a user to place the portable communication terminal 2 on the authentication stand on which NFC communication can be performed, or giving the alarm to remind the user of having left the portable communication terminal 2 in the vehicle compartment.

When multiple portable communication terminals 2 which have been authenticated through the Bluetooth communication are detected, the authentication ECU 10 discriminates the positions of the detected portable communication terminals 2 from one another. According to a situation in which the portable communication terminals 2 are determined to the first area to a fifth area, it may be possible that the authentication ECU 10 performs diverse pieces of processing by combining any of permission for engine start, permission for locking or unlocking of a door, permission for a welcome action, and a user notification feature.

Modifications

At S104 in the position determination processing of the first embodiment (referring to FIG. 2), and at S208, S304, and S312 in the position determination processing of the second embodiment (referring to FIG. 3 and FIG. 4), the distance between the portable communication terminal 2 and the vehicle 1 is classified into the short distance and the long distance. The present disclosure is not limited to this mode. The distance may be classified into any of finer divisions, and the authentication ECU 10 may perform different pieces of processing in association with the respective fine divisions.

At S112 in the position determination processing of the first embodiment (referring to FIG. 2) and at S218 in the position determination processing of the second embodiment (referring to FIG. 3), as an action to be performed when a portable communication terminal has been authenticated through the NFC communication, another action may be performed in addition to permission for engine start. For example, the present disclosure may collaborate with a so-called driving position memory feature that autonomously adjusts the position of a power seat, electric mirror, or electric tilt steering column based on a set value, which is preliminarily registered for each driver, when the driver boards a vehicle. In this case, when the portable communication terminal has been authenticated through the NFC communication, based on the set value preliminarily registered for each driver in association with the portable communication terminal 2 that has been authenticated, the position of the power seat, electric mirror, or electric tilt steering column is automatically adjusted suitably for the driver.

In the above embodiment, Bluetooth is adopted as the first wireless communication system (may be referred to as a first short distance wireless communication system) in the present disclosure, and NFC is adopted as the second wireless communication system (may be referred to as a second short distance wireless communication system). Alternatively, wireless communication systems other than NFC and Bluetooth may be adopted. In the embodiment, a reader writer feature is included in the NFC communicator 12 of the vehicle 1, and a card emulation feature is included in the NFC communication circuit 31 of the portable communication terminal 2. Alternatively, the reverse will do. Namely, the NFC communication circuit 31 of the portable communication terminal 2 may include at least a reader writer feature, and the NFC communicator 12 of the vehicle 1 may include at least a card emulation feature or an IC tag.

At S206 and S300 in position determination processing of the second embodiment (referring to FIG. 3 and FIG. 4), the controller 11 of the authentication ECU 10 analyzes images received from the portable communication terminal 2, and determines whether the portable communication terminal 2 exists in a vehicle compartment or outside a vehicle. Aside from this, the controller 30 of the portable communication terminal 2 may analyze images produced by the subject portable communication terminal 2, determine whether the subject portable communication terminal 2 exists in the vehicle compartment or outside the vehicle, and transmit a result of the determination to the authentication ECU 10.

At S202 in the position determination processing of the second embodiment (referring to FIG. 3), when a portable communication terminal 2 has been authenticated through the NFC communication (S202: Yes), whether multiple portable communication terminals 2 have been authenticated through Bluetooth communication may be determined. In this case, when multiple portable communication terminals 2 have been authenticated through the Bluetooth communication, areas (referring to FIG. 5) in which the respective portable communication terminals 2 exist are determined from one another in the same manner as that at S300, S304, and S312.

When a result of the area determination demonstrates that the portable communication terminals 2 exist in the first area as well as the third area, as an action associated with the first area and the third area, permission for engine start and locking of a door outside a vehicle, which is achieved by an electric door lock, are prohibited. In this case, even when a maneuver of locking the door outside the vehicle (for example, a maneuver of touching the touch sensor 20) is sensed, the door is not locked by activating the electric door lock. At this time, information indicating that locking the door outside the vehicle is prohibited may be transmitted to the portable communication terminal 2 which exists in the third area. The portable communication terminal 2 in the third area in turn outputs sounds through the loudspeaker 35 or outputs display using the display 36 so as to notify a user of the fact that locking the door outside the vehicle is prohibited.

A vehicle control apparatus according to one aspect of the present disclosure comprises a first communicator, a second communicator, a first authenticator, a second authenticator, a determinator, and a controller. The first communicator has a communication range outside a vehicle, and communicates with a portable communication terminal by a predetermined first wireless communication system. The second communicator has a communication range in a vehicle compartment of the vehicle, and communicates with the portable communication terminal by a second wireless communication system, which is different from the first wireless communication system. The first authenticator receives identification information from the portable communication terminal with the first communicator, and authenticates received identification information. The second authenticator receives identification information from the portable communication terminal with the second communicator, and authenticates received identification information.

The determinator determines that the portable communication terminal exists within a predetermined range outside the vehicle when the portable communication terminal is authenticated by the first authenticator and when the portable communication terminal is not authenticated by the second authenticator, and determines that the portable communication terminal exists in the vehicle compartment of the vehicle when the portable communication terminal is authenticated by the first authenticator and when the portable communication terminal is authenticated by the second authenticator. The controller permits or causes an electronic control device controlling an action of the vehicle to perform a predetermined action corresponding to a position of the portable communication terminal determined by the determinator.

According to the vehicle control apparatus of one aspect of the present disclosure, it may be possible to, depending on whether a portable communication terminal has been authenticated by two communicators of the first communicator, which performs communication directed to the outside of a vehicle, and the second communicator which performs communication directed to a vehicle compartment, reliably determine whether the portable communication terminal to be used as an electronic key exists outside the vehicle or in the vehicle compartment. In a conventional method in which whether the portable communication terminal exists outside the vehicle or in the vehicle compartment is determined using as a determination factor a physical quantity that has an error, such as, a received electric wave intensity or response time, the outside of the vehicle and the vehicle compartment may be erroneously discriminated from each other. In contrast, in the vehicle control apparatus in the aspect of the present disclosure, since a combination of authentications by the two communicators having different communication ranges is used as the determination factor, compared with the case where a phenomenon having an error, such as, the received electric wave intensity is used as the determination factor, it may be possible to reduce erroneous determination.

Incidentally, the BT communicator 16 corresponds to the first communicator of the present disclosure. The NFC communicator 12 corresponds to the second communicator. The controller 11 corresponds to a first authenticator, a second authenticator, a determinator, a controller, and acquisition portion. The antenna 19 corresponds to a first communication antenna, and the antenna 15 corresponds to a second communication antenna. The display 36 corresponds to an information presentation device.

Further, S100 and S200 of the embodiment correspond to the first authenticator. S102 and S202 of the embodiment correspond to the second authenticator. S104, S108 to S112, S206 to S218, and S300 to S318 correspond to the determinator.

It is noted that a flowchart or a processing of the flowchart in the present application includes multiple sections (also referred to as steps), each of which is represented, for example, as S100. Further, each section may be divided into several sub-sections, and several sections may be combined into a single section. Further, each section provided in this manner may be referred to as a device, a module, or means.

In the present embodiment, the parts are those into which the internal parts of the controller 11 are expediently classified in terms of features of the controller 11, but do not signify that the internal parts of the controller 11 are physically divided into portions associated with the parts. Therefore, each of the parts may be realized by software as part of a computer program, or may be realized by hardware in the form of an IC chip or large-scale integrated circuit.

While the embodiments, the configurations, and the modes according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle control apparatus, comprising:
a first communicator that has a communication range outside a vehicle, and communicates with a portable communication terminal by a predetermined first wireless communication protocol;
a second communicator that has a communication range in a vehicle compartment of the vehicle, and communicates with the portable communication terminal by a second wireless communication protocol, which is different from the first wireless communication protocol;
a first authenticator that receives identification information from the portable communication terminal with the first communicator, and authenticates a received identification information;
a second authenticator that receives identification information from the portable communication terminal with the second communicator, and authenticates a received identification information;
a determinator that
determines that the portable communication terminal exists within a predetermined range outside the vehicle when the portable communication terminal is authenticated by the first authenticator and when the portable communication terminal is not authenticated by the second authenticator, and
determines that the portable communication terminal exists in the vehicle compartment of the vehicle when the portable communication terminal is authenticated by the first authenticator and when the portable communication terminal is authenticated by the second authenticator; and
a controller that permits or causes an electronic control device controlling an action of the vehicle to perform a predetermined action corresponding to a position of the portable communication terminal determined by the determinator.

2. The vehicle control apparatus according to claim 1, wherein:
the first communicator includes a first communication antenna;
the first communication antenna is disposed to an external side of the vehicle with a vehicle body structure interposed between the vehicle compartment and the external side of the vehicle, the vehicle body structure partially restricting electric wave that invades into the vehicle compartment;
the second communicator includes a second communication antenna; and
the second communication antenna is disposed to face the vehicle compartment.

3. The vehicle control apparatus according to claim 1, wherein:
the determinator determines a distance from the vehicle to the portable communication terminal existing outside the vehicle based on a communication state by the first communicator, when the portable communication terminal is authenticated by the first authenticator and when the portable communication terminal is not authenticated by the second authenticator; and
the controller permits or causes the predetermined action, which is associated with the distance at which the portable communication terminal exists outside the vehicle, to be performed.

4. The vehicle control apparatus according to claim 1, wherein:
the first wireless communication protocol is provided by a communication protocol conformable to a communication protocol for a short distance wireless communication in a near-field type near field communication; and
the second wireless communication protocol is provided by a communication protocol conformable to Bluetooth communications protocol.

5. A vehicle control apparatus, comprising:
a first communicator that has a communication range outside a vehicle, and communicates with a portable communication terminal by a predetermined first wireless communication system;
a second communicator that has a communication range in a vehicle compartment of the vehicle, and communicates with the portable communication terminal by a second wireless communication system, which is different from the first wireless communication system;
a first authenticator that receives identification information from the portable communication terminal with the first communicator, and authenticates a received identification information;
a second authenticator that receives identification information from the portable communication terminal with the second communicator, and authenticates a received identification information;
a determinator that
determines that the portable communication terminal exists within a predetermined range outside the vehicle when the portable communication terminal is authenticated by the first authenticator and when the portable communication terminal is not authenticated by the second authenticator, and determines that the portable communication terminal exists in the vehicle compartment of the vehicle when the portable communication terminal is authenticated by the first authenticator and when the portable communication terminal is authenticated by the second authenticator;

a controller that permits or causes an electronic control device controlling an action of the vehicle to perform a predetermined action corresponding to a position of the portable communication terminal determined by the determinator; and an acquisition portion that acquires image information, which is produced by a camera-included in the portable communication terminal, through communication to be performed by the first communicator, wherein:

when the determinator determines that the portable communication terminal is authenticated by the first authenticator and the portable communication terminal is not authenticated by the second authenticator, the determinator causes the acquisition portion to acquire the image information produced by the portable communication terminal at a time when the determinator makes determination, and the determinator determines based on a result of analysis performed on the image information whether the portable communication terminal exists outside the vehicle or exists in the vehicle compartment while the second authenticator does not authenticate the portable communication terminal.

6. The vehicle control apparatus according to claim 5, wherein:

when a plurality of portable communication terminals that are not authenticated by the second authenticator and are authenticated by the first authenticator are detected, the determinator determines based on the image information produced by the detected portable communication terminals and acquired by the acquisition portion whether each of the portable communication terminals exists outside the vehicle or exists in the vehicle compartment while the second authenticator does not authenticate; and the controller permits or causes the electronic control device, which controls an action of the vehicle, to perform the predetermined action in accordance with a distribution state of positions of the portable communication terminals.

7. The vehicle control apparatus according to claim 6, wherein:

the controller causes a predetermined information presentation device to notify a user of a fact that the portable communication terminal is placed in the vehicle compartment, when the plurality of portable communication terminals mixedly exist outside the vehicle and in the vehicle compartment.

* * * * *